United States Patent
Lavoie et al.

(10) Patent No.: US 8,914,195 B2
(45) Date of Patent: *Dec. 16, 2014

(54) POWER ON DEMAND STEERING WHEEL ANGLE SENSOR

(71) Applicant: Ford Global Technologies, Dearborn, MI (US)

(72) Inventors: Erick Michael Lavoie, Dearborn, MI (US); Bradley G. Hochrein, Dexter, MI (US)

(73) Assignee: Ford Global Technologies, Dearborn, MI (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/764,272

(22) Filed: Feb. 11, 2013

(65) Prior Publication Data

US 2013/0151080 A1    Jun. 13, 2013

Related U.S. Application Data

(62) Division of application No. 12/697,307, filed on Feb. 1, 2010, now Pat. No. 8,396,628.

(51) Int. Cl.
*B62D 6/00* (2006.01)
*B62D 5/04* (2006.01)
*B62D 15/02* (2006.01)

(52) U.S. Cl.
CPC ............ *B62D 5/0481* (2013.01); *B62D 15/021* (2013.01)
USPC ................ 701/41; 701/42; 701/49; 174/72 A; 180/170; 180/249; 180/402; 180/446; 340/932.2; 303/177; 315/77; 324/207.21; 324/332; 362/466; 200/61.54; 73/866.1; 74/552

(58) Field of Classification Search
USPC ....... 701/41, 42, 49; 174/72 A; 180/170, 249, 180/402, 446; 340/932.2; 303/177; 315/77; 324/207.21, 332; 362/466; 200/61.54; 73/866.1; 74/552
See application file for complete search history.

(56) References Cited

U.S. PATENT DOCUMENTS

| | | | |
|---|---|---|---|
| 6,755,560 B2* | 6/2004 | Horii | 362/466 |
| 6,778,892 B2* | 8/2004 | Horii et al. | 701/49 |
| 7,513,663 B2 | 4/2009 | Merchant et al. | |
| 7,954,593 B2* | 6/2011 | Dornhege et al. | 180/446 |
| 8,090,503 B2* | 1/2012 | Lavoie et al. | 701/42 |
| 2001/0002623 A1* | 6/2001 | Tsunoda et al. | 174/72 A |
| 2001/0017591 A1* | 8/2001 | Kuriya et al. | 340/932.2 |
| 2001/0033106 A1* | 10/2001 | Shirai et al. | 303/177 |
| 2001/0042652 A1* | 11/2001 | Watson et al. | 180/249 |
| 2001/0042678 A1* | 11/2001 | Hecht et al. | 200/61.54 |
| 2002/0003055 A1* | 1/2002 | Leitner et al. | 180/170 |
| 2002/0065593 A1* | 5/2002 | Ozaki | 701/41 |
| 2003/0019685 A1* | 1/2003 | Graber et al. | 180/402 |

(Continued)

*Primary Examiner* — James Trammell
*Assistant Examiner* — Sanjeev Malhotra
(74) *Attorney, Agent, or Firm* — Angela M. Brunetti; Raymond Coppiellie

(57) ABSTRACT

A system for powering a steering angle sensor coupled to a steering wheel and a controller comprising a switch, coupled to the sensor and the controller. The switch is activated upon motion of the steering wheel or steering shaft. The switch, when activated, connects a power supply, such as a vehicle battery, to the sensor and the controller so that a new steering angle may be sensed and stored. After a predetermined period of time, the controller sends a signal to deactivate the switch and disconnect the power supply.

7 Claims, 2 Drawing Sheets

(56) References Cited

U.S. PATENT DOCUMENTS

| | | | |
|---|---|---|---|
| 2003/0107321 A1* | 6/2003 | Horiuchi | 315/77 |
| 2003/0122542 A1* | 7/2003 | Koga et al. | 324/207.21 |
| 2004/0061500 A1* | 4/2004 | Lou et al. | 324/332 |
| 2004/0117088 A1* | 6/2004 | Dilger | 701/41 |
| 2006/0225524 A1* | 10/2006 | Hakvoort et al. | 73/866.1 |
| 2008/0011539 A1* | 1/2008 | Riepold et al. | 180/446 |
| 2009/0187311 A1* | 7/2009 | Christiansen et al. | 701/42 |
| 2009/0287375 A1* | 11/2009 | Lavoie et al. | 701/42 |
| 2009/0319125 A1* | 12/2009 | Lavoie | 701/41 |
| 2010/0218641 A1* | 9/2010 | Neumann et al. | 74/552 |

* cited by examiner

POWER ON DEMAND STEERING WHEEL ANGLE SENSOR

CROSS REFERENCE

This application is a divisional of co-pending U.S. application Ser. No. 12/697,307 filed on Feb. 1, 2010, herein incorporated by reference.

TECHNICAL FIELD

The inventive subject matter relates to a steering wheel angle sensor and more particularly, to a power on demand steering wheel angle sensor.

BACKGROUND

A steering angle sensor detects a steering angle of a steering wheel of a vehicle and provides a signal necessary for a vehicle control system to calculate a steering wheel angle, which is used in many vehicle control systems. When the vehicle is not in use, the ignition switch is powered off, and there is typically no power provided to the steering angle sensor. In rare instances the steering wheel may be turned when the vehicle is powered off, and the many vehicle control systems that rely on a known steering wheel angle will be affected, if a discrepancy exists between the steering wheel angle at the time the vehicle is powered of and the steering wheel angle at the time the vehicle is started up again, vehicle control systems may be adversely affected. Examples of vehicle systems that rely on accurate steering angle include electronic stability control, roll stability control, electric power steering, active park assist, advanced braking systems, steerable headlamps, and advanced accident avoidance systems, among others.

In order to combat this problem, a solution has been provided in which continuous power is supplied to the steering angle sensor, regardless of the state of the ignition switch. Typically the continuous power is supplied by the vehicle's battery, thereby consuming valuable battery power when the ignition is turned off. Another proposed solution is to store as learned angle at the time the vehicle is powered off and retrieve the stored angle at power on. The stored angle is a tentative angle until which time the vehicle moves and can confirm or reject the stored angle as a correct steering angle. Still another solution has been proposed in which power is intermittently supplied to the steering angle sensor and the sensor periodically detects the steering wheel angle. This solution conserves power but introduces the likelihood that a change in the steering angle may be missed should the change occur during a period of no power.

There is a need for a reliable solution to collecting a steering angle even during periods when the vehicle is powered down without wasting valuable battery power.

SUMMARY

The present invention is a power on-demand steering angle sensor coupled to a steering wheel and a controller. A switch, coupled to the sensor and the controller, is activated upon motion of the steering wheel or steering shaft. The switch, when dosed, connects a power supply. such as a vehicle battery to the sensor and the controller so that a new steering angle may be sensed and stored. After a predetermined period of time, the controller sends a signal to open the switch and disconnect the power supply.

Elements and steps in the figures are illustrated for simplicity and clarity and have not necessarily been rendered according to any particular sequence. For example, steps that may be performed concurrently or in different order are illustrated in the figures to help improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
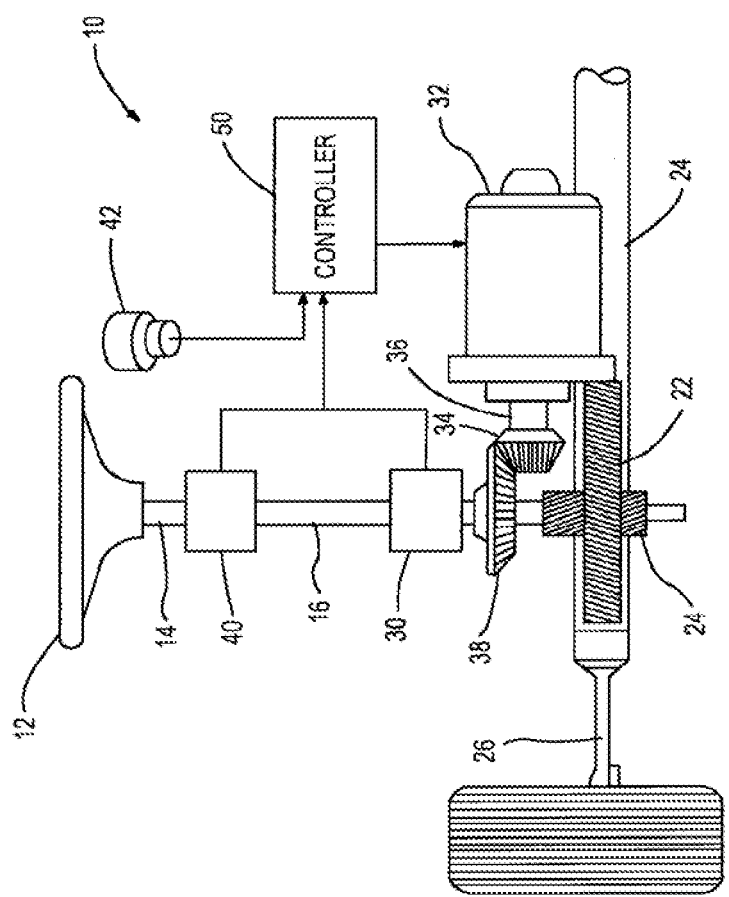
FIG. 1 is a view of an electrically assisted power steering system having a power on demand steering angle sensor of the present invention.

Referring to FIG. 1, an electrically assisted power steering system 10 is shown that includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and tire assembly 28 in a conventional manner.

A steering torque sensor 30 is incorporated in the steering shaft 16 for detecting a steering torque applied by an operator to the steering shaft 16 by way of the steering wheel 12. An electric motor 32 includes an output gear 34 mounted on an output shaft 36 for drivingly engaging an assist input gear 38 mounted on the steering shaft 16. Alternatively, not shown, the electric motor 32 may have its output shaft 36 and an output gear 34 arranged to directly engage the steering rack 24.

The system may include a steering wheel angle sensor 40 connected to the steering shaft 16 and a vehicle speed sensor 42. The steering wheel angle sensor 40 provides a steering angle signal indicative of the relative rotational position of the steering shaft 16. The various signals generated by the system are ted to an electric motor control module 50, which then determines a motor drive signal to actuate the electric motor 32, thereby providing the desired assist torque.

At a point in time when the vehicle is powered off, the steering angle sensed at ignition-off is stored in memory in the controller 50. Any movement of the steering wheel 12 and steering shaft 16 that occurs after power off will need to be sensed by the steering angle sensor 40 and stored in memory in the controller 50 in order to provide an accurate steering angle for each vehicle control system upon start up of the vehicle. Typically, when the vehicle is powered off, there is no power supplied to the steering angle sensor 40 or the controller 50. According to the present invention, the power on demand steering angle sensor 40 includes a switch mechanism 44 coupled to the sensor 40 and the controller 50 as well as a power supply 60. Physical movement of the steering wheel 2 or steering shaft 16 affects the switch mechanism, which becomes closed and thereby coupled to the power supply 60. The power supply may be a battery, a generator, or other source of power. The closed switch position allows power to be supplied to the steering angle sensor 40 and the controller 50 so that the new steering angle position may he detected and stored in memory.

In order to conserve battery power, the switch does not remain in the dosed position. The switch connection occurs only for a time period long enough in which to sense and store the new steering angle. Within the controller 50, logic exists for the switch to remain closed for a predetermined period of time, during which the sensor 40 may sense the steering angle change and store a new steering angle in a memory 52 of the controller 50. At the end of the predetermined period of time, the switch 44 will be opened, thereby de-coupling the power supply 60 from the steering angle sensor 40. The battery power is only accessed as needed by the steeling angle sensor 40.

Figure 2:
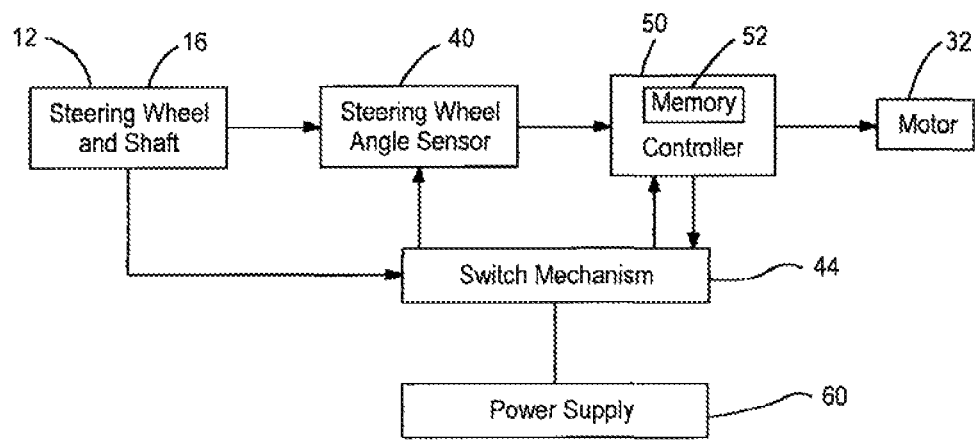
FIG. 2 is a block diagram of an embodiment of the self-powered steering angle sensor of the present invention.
Figure 3:
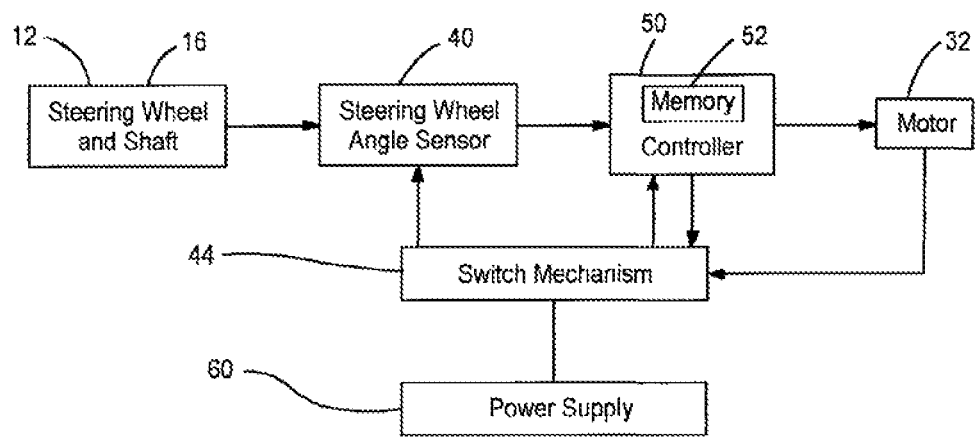
FIG. 3 is a block diagram of another embodiment of the self-powered steering angle sensor of the present invention.

The switch mechanism 44 may not require electric power in order to close, however a signal from the controller is sent to the switch 44 after the predetermined period of time has passed to re-open the switch 44 disconnecting it from the power supply 68 and conserving valuable battery power. In the embodiment shown in FIG. 2, the switch 44 is mechanically activated. The switch position is affected by physical movement in the steering wheel 12 or steering shaft 16. In another embodiment, shown in FIG. 3, the switch 44 is activated electrically by a pulsee that ma be supplied by the electric power assisted steering system motor 32. The pulse is generated from movement associated with a change in the steering angle while the vehicle is powered off. The electric motor 32 will generate a small amount of power, i.e., a pulse, when the steering shaft is moved, and that pulse may he used to selectively operate the switch 44 in order to connect the power supply 60 to the steering angle sensor 40 and the controller 50 for the predetermined period of time.

As discussed above, the power supply 60 may be the vehicle's battery. In the event there is insufficient battery power to update the steering wheel angle according to the present invention, a "low battery" flag may be stored in the controller 50 as an indicator that a new steering wheel angle needs to he re-learned at key on.

An advantage of the present invention is that less battery power is consumed because power is supplied to the steering angle sensor only when needed. Another advantage is realized in that the absolute steering wheel angle, not to mention an accurate absolute steering wheel angle, is available more of the time to various vehicle control systems that require the steering wheel angle as an input. A further advantage is realized in that a simple relative angle measurement sensor may be implemented as an absolute sensor once the steering angle is learned and would not require re-learning the angle when the vehicle is keyed on and off. Because a simple relative angle sensor is less expensive than an absolute angle sensor, there is the benefit of a cost savings.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention.

Accordingly, the scope of the invention should be determined by the claims and their legal equivalents rather than by merely the examples described. For example, the components or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited, but may also include other elements not expressly listed or inherent to such process, method, article, composition or apparatus. Other combinations or modifications of the above described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A system for powering a steering angle sensor during ignition-off, the system comprising:
    a controller coupled to the steering angle sensor;
    a switch coupled to the steering angle sensor and the controller, the switch is activated by steering wheel motion during times when an ignition switch is powered off; and
    a power supply coupled to the switch and supplying power to the steering angle sensor and the controller for a predetermined time during times when the ignition switch is powered off such that, upon steering wheel motion that activates the switch, a newly sensed steering angle is stored in the controller.

2. The system as claimed in claim 1 wherein the controller sends a signal to deactivate the switch after the predetermined period of time has elapsed.

3. The system as claimed in claim 1 wherein the switch mechanism is activated mechanically due to movement of the steering wheel.

4. The system as claimed in claim 1 further comprising a motor coupled to the controller, whereby the switch mechanism is activated by receiving an electric pulse generated in the motor by movement in the steering wheel.

5. The system as claimed in claim 1 further comprising a flag indicating low battery power, the flag is stored in the controller when there is insufficient battery power to detect and store a change in steering angle and provides an indication that the steering wheel angle must be relearned at key on.

6. The system as claimed in claim 4 wherein the motor is an electric motor.

7. The system as claimed in claim 6 wherein the electric motor is part of an electrically power assisted steering system.

* * * * *